United States Patent
Wang et al.

(10) Patent No.: US 9,582,520 B1
(45) Date of Patent: Feb. 28, 2017

(54) TRANSACTION MODEL FOR DATA STORES USING DISTRIBUTED FILE SYSTEMS

(71) Applicant: EMC IP Holding Company LLC, Hopkinton, MA (US)

(72) Inventors: Zhanwei Wang, Beijing (CN); Lei Chang, Beijing (CN); Tao Ma, Beijing (CN); Luke Lonergan, San Carlos, CA (US); Lirong Jian, Beijing (CN); Lili Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 13/853,803

(22) Filed: Mar. 29, 2013

Related U.S. Application Data

(60) Provisional application No. 61/769,043, filed on Feb. 25, 2013.

(51) Int. Cl.
*G06F 17/30* (2006.01)
(52) U.S. Cl.
CPC .............................. *G06F 17/30283* (2013.01)
(58) Field of Classification Search
CPC ......... G06F 17/30595; G06F 17/30545; G06F 17/30289; G06F 17/30463; G06F 17/30864; G06F 17/30979; G06F 17/30283
USPC ........................................................ 707/718
See application file for complete search history.

(56) References Cited

U.S. PATENT DOCUMENTS

| | | | |
|---|---|---|---|
| 5,933,422 A | 8/1999 | Kusano et al. | |
| 7,599,969 B2 | 10/2009 | Mignet et al. | |
| 7,653,665 B1 * | 1/2010 | Stefani et al. | 714/19 |
| 7,921,130 B2 | 4/2011 | Hinshaw et al. | |
| 7,984,043 B1 * | 7/2011 | Waas | 707/718 |
| 8,266,122 B1 * | 9/2012 | Newcombe et al. | 707/695 |
| 8,359,305 B1 * | 1/2013 | Burke et al. | 707/706 |
| 8,572,051 B1 * | 10/2013 | Chen et al. | 707/687 |

(Continued)

FOREIGN PATENT DOCUMENTS

WO 2012050582 A1 4/2012

OTHER PUBLICATIONS

Brad Hedlund, "Understanding Hadoop Clusters and the Network," Bradhedlund.com, 2011, pp. 1-22. Available at http://bradhedlund.com/2011/09/10/understanding-hadoop-clusters-and-the-network/.

*Primary Examiner* — Apu Mofiz
*Assistant Examiner* — Jared Bibbee
(74) *Attorney, Agent, or Firm* — Van Pelt, Yi & James LLP

(57) ABSTRACT

A transaction model for data stores using a distributed file system is disclosed. In various embodiments, a transaction-related metadata is sent to each of a plurality of segments to which a corresponding assigned portion of a query plan is assigned. A metadata modification record is received from zero or more of the segments, reflecting changes, if any, to system metadata required to be made to reflect changes to data made by that segment in processing the portion of the query plan assigned to that segment. It is determined whether a metadata modification record has been received from each of the segments in the plurality of segments. In the event a metadata modification record is determined to have been received from each of the segments in the plurality of segments, a system metadata store is updated to reflect the respective metadata modification records received from the plurality of segments.

25 Claims, 6 Drawing Sheets

(56) References Cited

U.S. PATENT DOCUMENTS

| | | | |
|---|---|---|---|
| 8,713,038 B2 | 4/2014 | Cohen et al. | |
| 8,805,870 B2 | 8/2014 | Chen et al. | |
| 8,868,546 B2* | 10/2014 | Beerbower et al. | 707/718 |
| 2003/0212668 A1 | 11/2003 | Hinshaw et al. | |
| 2004/0030739 A1 | 2/2004 | Yousefi'zadeh | |
| 2004/0186842 A1* | 9/2004 | Wesemann | 707/100 |
| 2005/0289098 A1* | 12/2005 | Barsness et al. | 707/1 |
| 2008/0059489 A1 | 3/2008 | Han et al. | |
| 2008/0195577 A1 | 8/2008 | Fan et al. | |
| 2008/0222090 A1 | 9/2008 | Sasaki | |
| 2008/0244585 A1* | 10/2008 | Candea | G06F 11/008 718/102 |
| 2009/0043745 A1 | 2/2009 | Barsness et al. | |
| 2009/0182792 A1* | 7/2009 | Bomma et al. | 707/206 |
| 2009/0234850 A1* | 9/2009 | Kocsis et al. | 707/6 |
| 2009/0254916 A1 | 10/2009 | Bose et al. | |
| 2009/0271385 A1 | 10/2009 | Krishnamoorthy et al. | |
| 2010/0223305 A1* | 9/2010 | Park et al. | 707/814 |
| 2010/0241827 A1 | 9/2010 | Yu et al. | |
| 2011/0047172 A1 | 2/2011 | Chen et al. | |
| 2011/0131198 A1 | 6/2011 | Johnson et al. | |
| 2011/0228668 A1 | 9/2011 | Pillai et al. | |
| 2011/0231389 A1 | 9/2011 | Surna et al. | |
| 2011/0246511 A1 | 10/2011 | Smith et al. | |
| 2011/0302164 A1* | 12/2011 | Krishnamurthy | G06F 17/30979 707/737 |
| 2012/0036146 A1 | 2/2012 | Annapragada | |
| 2012/0191699 A1 | 7/2012 | George et al. | |
| 2012/0259894 A1* | 10/2012 | Varley et al. | 707/795 |
| 2013/0117237 A1* | 5/2013 | Thomsen | G06F 17/30377 707/683 |
| 2013/0138612 A1* | 5/2013 | Iyer | 707/638 |
| 2013/0166523 A1* | 6/2013 | Pathak | G06F 9/466 707/703 |
| 2014/0019683 A1 | 1/2014 | Ishikawa | |
| 2014/0067792 A1 | 3/2014 | Erdogan et al. | |
| 2014/0095526 A1 | 4/2014 | Harada et al. | |
| 2014/0108459 A1 | 4/2014 | Gaza et al. | |
| 2014/0108861 A1 | 4/2014 | Abadi et al. | |
| 2014/0122542 A1 | 5/2014 | Barnes et al. | |
| 2014/0136590 A1 | 5/2014 | Marty et al. | |
| 2014/0149357 A1 | 5/2014 | Gupta | |
| 2014/0188841 A1 | 7/2014 | Sun et al. | |
| 2014/0195558 A1 | 7/2014 | Murthy et al. | |
| 2014/0201565 A1* | 7/2014 | Candea | G06F 11/079 714/6.2 |

* cited by examiner

TRANSACTION MODEL FOR DATA STORES USING DISTRIBUTED FILE SYSTEMS

CROSS REFERENCE TO OTHER APPLICATIONS

This application claims priority to U.S. Provisional Patent Application No. 61/769,043 entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

Distributed storage systems enable databases, files, and other objects to be stored in a manner that distributes data across large clusters of commodity hardware. For example, Hadoop® is an open-source software framework to distribute data and associated computing (e.g., execution of application tasks) across large clusters of commodity hardware.

EMC Greenplum® provides a massively parallel processing (MPP) architecture for data storage and analysis. Typically, data is stored in segment servers, each of which stores and manages a portion of the overall data set.

Distributed systems, such as a distributed database or other storage system, typically embody and/or employ a "transaction model" to ensure that a single logical operation on the data, the processing of which may be performed by more than one node, is performed collectively in a manner that ensures certain properties, such as atomicity (modifications made potentially by more than one node either succeed or fail together), consistency (database is never left in a "half-finished" state, and instead is left in a state wholly consistent with its rules), isolation (keep transactions separate from each other until they are finished), and durability (once a transaction is "committed", its effects on the data will not be lost, due to power fail, etc.

Two-phase commit protocol or other distributed transaction commit protocols are commonly used to implement global transaction in a parallel transactional MPP database system. These distributed transaction protocols are complicated to implement and require multiple interactions between master and slave/worker nodes. Also, typically each node must keep its own log.

BRIEF DESCRIPTION OF THE DRAWINGS

Various embodiments of the invention are disclosed in the following detailed description and the accompanying drawings.

DETAILED DESCRIPTION

Figure 1:
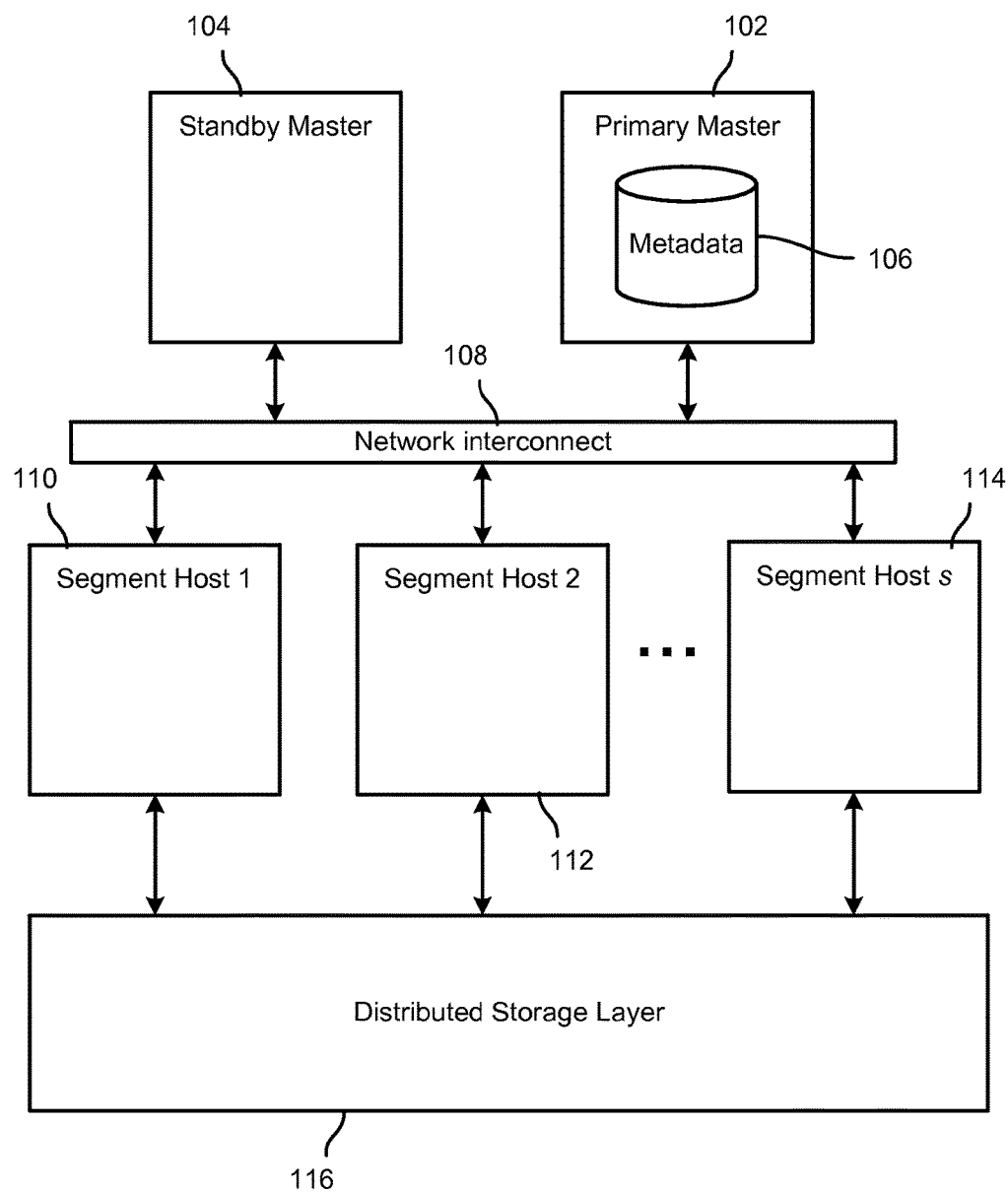
FIG. 1 is a block diagram illustrating an embodiment of a large scale distributed system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A transaction model for a large-scale parallel analytic database system is disclosed. In various embodiments, a master node is responsible for keeping transaction state of metadata for the entire distributed system and maintains data consistency of whole cluster. Distributed processing units, sometimes referred to herein as "segments", in various embodiments are stateless execution engines. The master node sends to each segment the system metadata required by that segment to execute its part of a query plan, and the segment returns to the master node that segment's query results and a metadata modification record to reflect changes made by that segment, if any, to the data in connection with executing the query. The master node implements a single node transaction model and a transaction is committed only if all participating segments complete their transaction-related work successfully. If all succeed, the master uses the metadata modification records received from the respective participating segments to update the system metadata and commits the transaction. If any one or more participating segments fail, the transaction is aborted and none of the metadata modification records is/are written to the system metadata.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in distributed storage layer 116, e.g., a Hadoop® or other storage layer.

When the master node 102 accepts a query, it is parsed and planned according to the statistics of the tables in the query, e.g., based on metadata 106. After the planning phase, a query plan is generated. A query plan is sliced into many slices. In a query execution phase, a "gang" or other grouping of segments is allocated for each slice to execute the slices.

Figure 2:
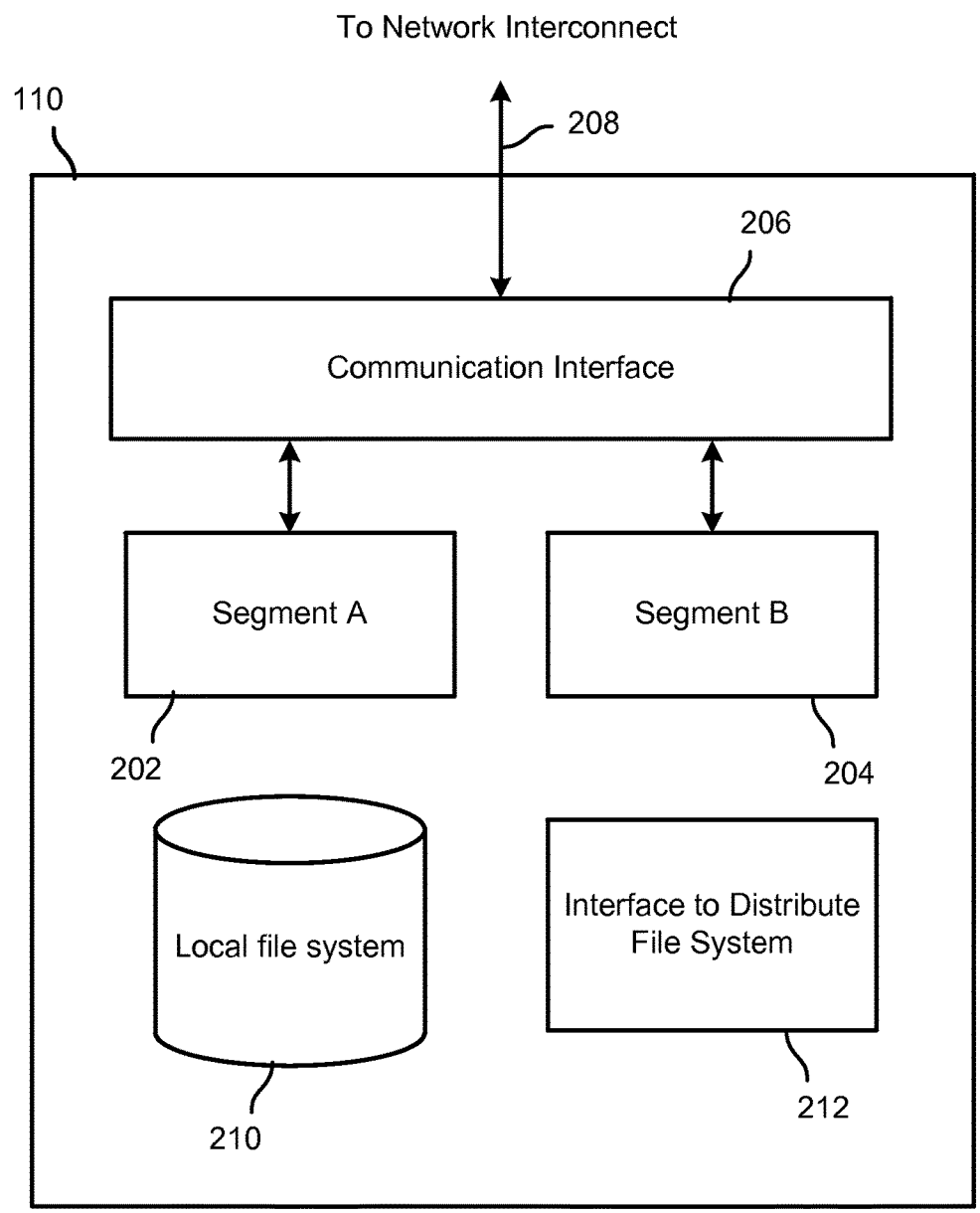
FIG. 2 is a block diagram illustrating an embodiment of a segment host.

FIG. 2 is a block diagram illustrating an embodiment of a segment host. In the example shown, segment host 110 includes a first segment 202 and a second segment 204 connected via a communication interface 206, such as a network interface card, and a physical (e.g., wired or wireless) connection 208 to a network interconnect, such as network interconnect 108 of FIG. 1. While two segments are included in the segment host 110 as shown in FIG. 2, in other embodiments more or fewer segments may be provided in a single segment host. In various embodiments, segments 202 and 204 are stateless execution engines. Segments 202 and 204 in various embodiments do not themselves maintain any transaction or other state. In some embodiments, if in connection with performing an assignment slice or other portion of a query plan a segment such as segment 202 or segment 204 changes data as stored in an associated distributed storage layer, such as distributed storage layer 116 of FIG. 1, for example by appending new rows to a file comprising a portion of a database table and saving the updated file to a distributed file system associated with the distributed storage layer, e.g., a Hadoop distributed file system (HDFS), the segment prepares and sends to the master (e.g., primary master) a metadata modification record or other communication that informs the master of changes made by the segment to the data set. For example, the segment may include in the metadata modification record a new end of file (EOF) and/or other file size or extent data, indicating a new EOF that reflects data added to the file by the segment.

In the example shown in FIG. 2, the segment host 110 includes a local file system 210 and an interface 212 to the distributed file system. In some operations, segments will append data into user-defined tables. Appended data may be buffered into segment host memory during execution and written into the file system as a batch operation. In some embodiments, all data will be written by a segment into the distributed file system permanently before execution of a query portion by the segment is considered to be complete. In various embodiments, segments do not write logs, control files, or any other data except user-defined tables.

In various embodiments, a large-scale distributed database system such as the one shown in FIG. 1 only supports read-only query and append operations on user-defined tables. User-defined tables can be stored on a shared file system, such as one associated with distributed storage layer 116, or a segment host's native file system, such as local file system 210 of FIG. 2. To store user-defined tables, in some embodiments the system only requires the distributed and/or segment host file system to support read, append (e.g., add rows), and truncate operations. The system stores metadata, log files, and control files on master's native file system, and requires the master's file system to support random read and write operations.

Figure 3:
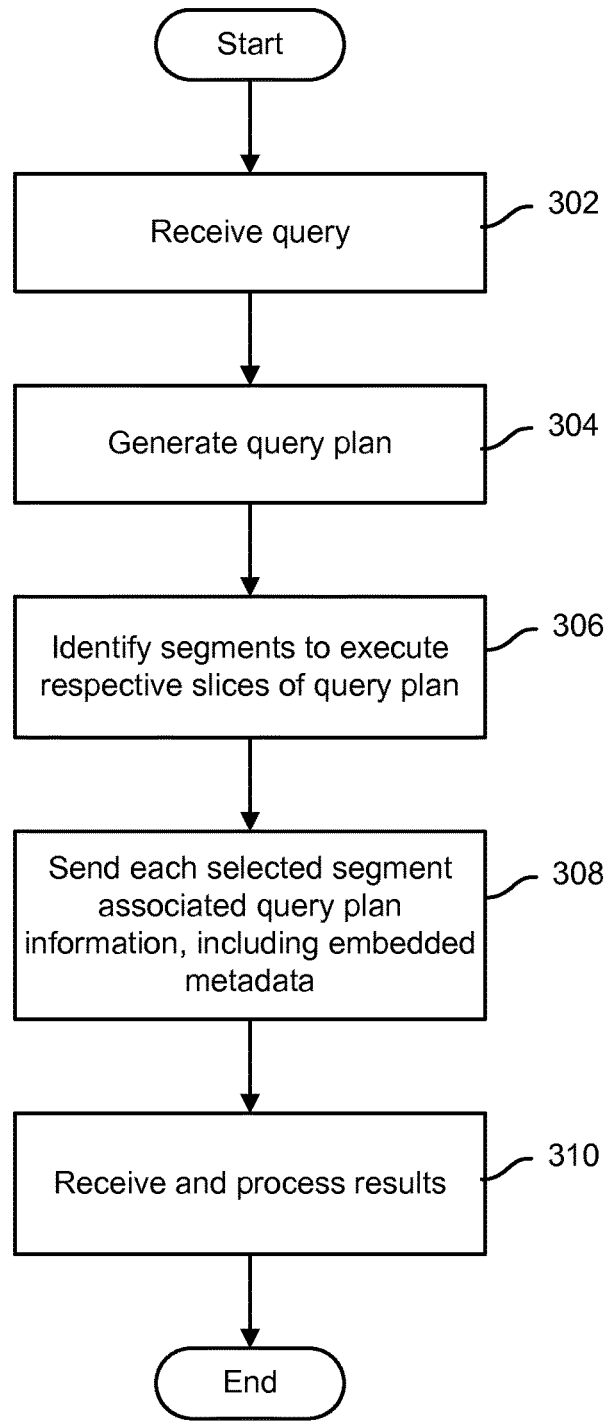
FIG. 3 is a flow chart illustrating an embodiment of a database query processing process.

FIG. 3 is a flow chart illustrating an embodiment of a database query processing process. In some embodiments, a master node, such as primary master 102 of FIG. 1, implements the process of FIG. 3. In the example shown, a query is received (302). A query plan is generated (304). The plan is divided into a plurality of slices, and for each slice a corresponding set of segments ("gang") is identified to participate in execution of that slice of the query plan (306). For each slice of the query plan, the segments selected to perform processing required by that slice are sent a communication that includes both the applicable portion of the plan to be performed by that segment and metadata that may be required by a receiving segment to perform tasks assigned to that segment (308). In some embodiments, the metadata included in the query plan slice and/or other communication sent to the respective segments selected to participate in execution of that slice of the plan includes metadata from a central metadata store, e.g., metadata 106 of FIG. 1, and includes information indicating to the segment the location of data with respect to which that segment is to perform query plan slice related processing. Query results are received from the respective segments to which query tasks were dispatched, and processed to generate, e.g., at the master node, a master or overall response to the query (310).

Figure 4:
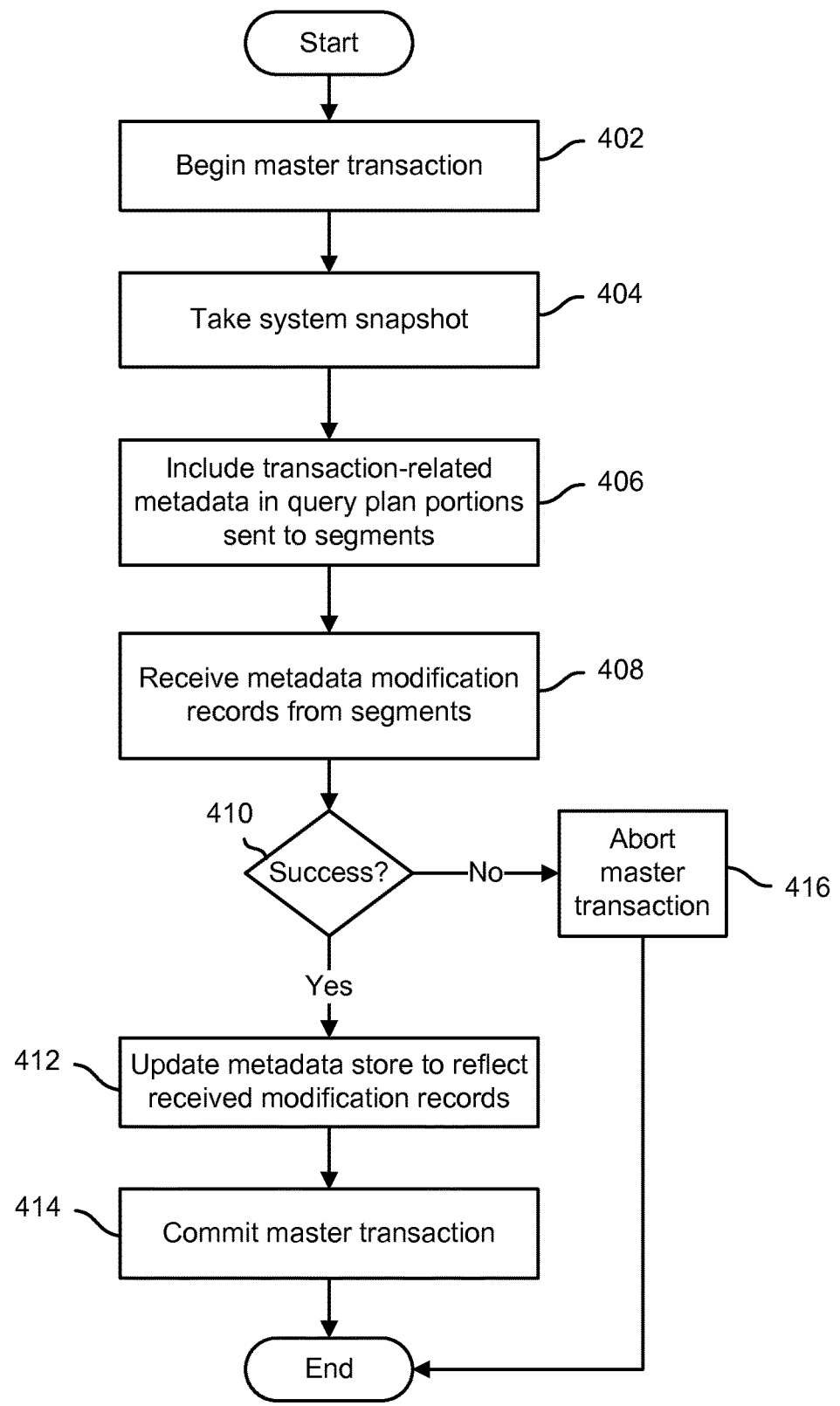
FIG. 4 is a flow chart illustrating an embodiment of a transaction control process.

FIG. 4 is a flow chart illustrating an embodiment of a transaction control process. In various embodiments, the process of FIG. 4 may be implemented by a master node, such as primary master 102 of FIG. 1. In some embodiments, the process of FIG. 4 implements a transaction model with respect to and in connection with query processing as shown in FIG. 3. In the example shown in FIG. 4, the master begins a transaction (402). In some embodiments, the masters accepts query from a user and starts the transaction implicitly if the user did not submit the query in a transaction block. The master records a current snapshot of the distributed database system (404). In some embodiments, the snapshot includes transaction identifiers for all transactions that are running when the current transaction starts. In some embodiments, the snapshot is used to verify system metadata visibility.

In various embodiments, the master adopts a traditional single node transaction implementation, for example in various embodiments a write ahead log (WAL) and multi-version concurrency control (MVCC) algorithms are used to implement transactions. The master is responsible for the metadata's consistency, isolation, atomicity, and durability. All modification of metadata as a result of processing on segments is recorded in various embodiments on the local file system of the master.

Continuing with the example shown in FIG. 4, any transaction-related metadata that may be needed at a segment to perform query-related processing assigned to that segment is communicated to the segment by the master (406). For example, in some embodiments a query plan portion or other assignment sent to a segment will include an identification and/or location of one or more files comprising a table, and for each file an end of file (EOF) or other data indicating a size and/or extent of the last valid data in the file. For example, a segment may have appended rows to a table (or portion thereof) by adding data to a file and saving the file to the distributed file system. However, if any segment working on the same query plan failed, in some embodiments the entire transaction would have been aborted by the master, resulting in invalid data having been appended to the file. In such a case, the system metadata at the master would not have been updated to reflect that the appended data was valid. In a subsequent operation, the master would send to the segment metadata indicating which portion of the file was valid, for example, enabling the segment to act accordingly, as discussed more fully below.

As the various segments to which portions of the query plan were assigned completed their work, each segment that successfully completed its work would send to the master a metadata modification record reflect which, if any, changes that segment made to system data. For example, if a segment appended rows to a table or portion thereof and saved those changes to an associated file, the metadata modification record may reflect a new EOF or other indication of valid file size and/or extent. As noted in FIG. 4, these metadata modification records are received by the master (408). If all segments assigned to work on portions of the query plan complete their work successfully (410), then the master replays the received metadata modification records to update system metadata (412) and commits the transaction (414). If any one or more segments fail, however (410), the master aborts the transaction (416), and does not update the system metadata to incorporate any of the metadata modification records received from the nodes that were successful.

Figure 5:
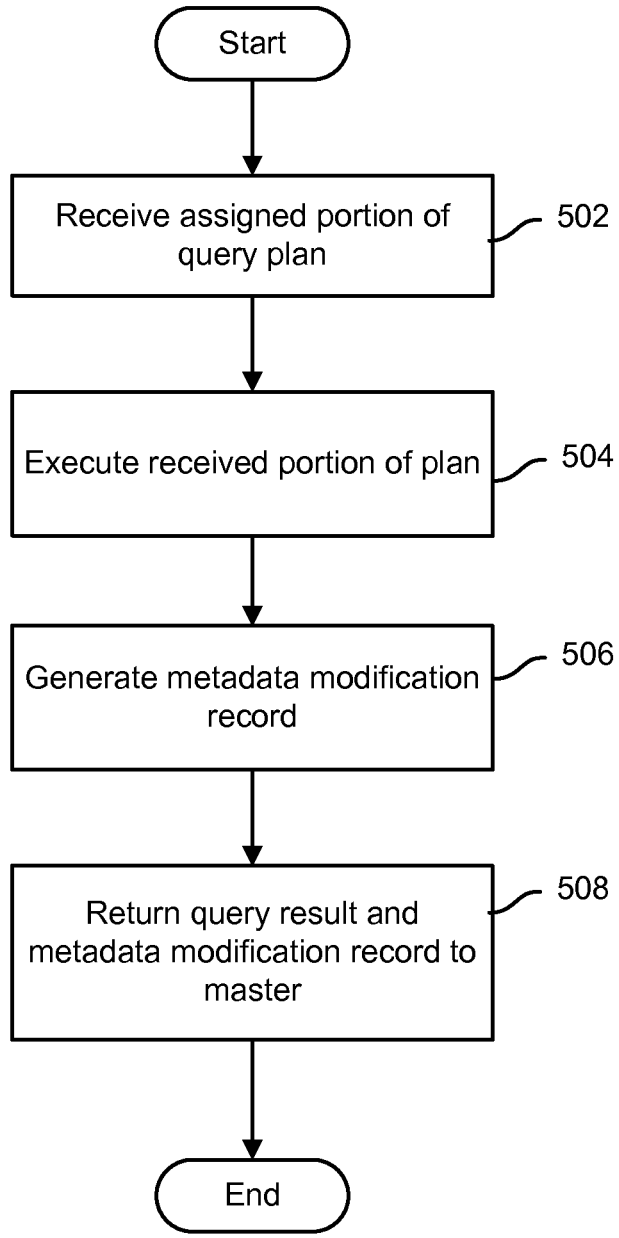
FIG. 5 is a flow chart illustrating an embodiment of a segment query execution process.

FIG. 5 is a flow chart illustrating an embodiment of a segment query execution process. In various embodiments, the process of FIG. 5 is implemented on each of a plurality of segments comprising the distributed system, such as segments 202 and 204 of FIG. 2. In the example shown, an assigned portion of a query plan is received (502). The assigned query plan portion is executed (504). A metadata modification record is generated to reflect changes made to data, if any, in connection with performing the assigned portion of the query plan (506). The query result, including and/or accompanied by the metadata modification record, are returned to the master (508).

Figure 6:
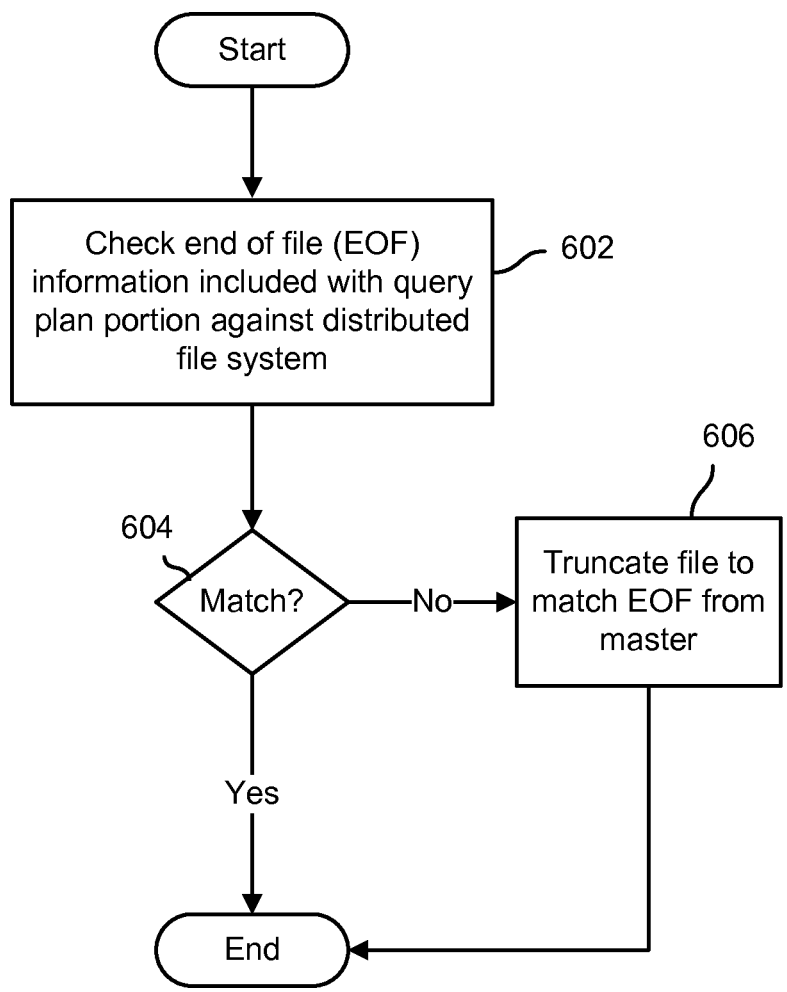
FIG. 6 is a flow chart illustrating an embodiment of a data validation process.

FIG. 6 is a flow chart illustrating an embodiment of a data validation process. In various embodiments, the process of FIG. 6 is included in and/or performed in connection with step 504 of FIG. 5. In the example shown, in connection with performing an assigned portion of a query plan, end of file (EOF) or other metadata indicating a valid size or extent of a file the segment has been assigned to process (e.g., to append rows or other data) is checked against corresponding information obtained from the distributed file system (602). If the information from the file system matches the metadata received from the master, e.g., the file size or extent as stored on the distributed file system matches the size of the file as reflected in system metadata as reported by the master (604), the validation process ends. If instead the actual size of the file is larger than the valid size indicated by the master (604), as would occur for example if a segment updated a file in connection with a system-wide transaction that was aborted because another node failed, resulting in metadata not being updated at the master to reflect changes that may have been made in connection with the aborted transaction, then the segment truncates the file as store on the distributed file system so that the size of the file as stored on the distributed file system is the same as the size reflected in system metadata at the time the current transaction started (606). In various embodiments, one or more clean up processes may run in the background and may truncate, prior to a subsequent query affecting the file being received, a file that includes more data than the system metadata indicates as being valid.

In various embodiments, modifications to metadata on segments are not visible on the master until the master receives all metadata modification records from the respective segments participating in the transaction and replays them on master. In some embodiments, during execution of a portion of a query plan metadata modification associated with processing performed by a segment is visible to the segment.

In some embodiments, if the master were to want to make the metadata modification visible on all segments during the course of an operation, the master may split the operation into multiple sub-operations and dispatch the sub-operation (s) multiple times and/or as required to make the metadata modifications visible on all segments during the course of the overall operation.

In various embodiments, the master recovers itself (e.g., after a failure) as if it is a single node system. All committed transactions must be recovered, and after recovery, the system metadata is left in a consistent state. In various embodiments, segments do not need a recovery process, because they do not maintain any system state.

In various embodiments, the master adopts a traditional single node method such MVCC and lock to enable multiple sessions to access the metadata concurrently.

In some embodiments, only an append operation is supported in the system. The master keeps track of the logical file length for each user-defined table's files. Each read session may get a different logical file length from metadata depending on the metadata's visibility. The system controls the visibility of user-defined tables by the visibility of the logical file length.

In some embodiments, each user-defined table has a set of files, each file can be appended by one and only one write session, but can be read by multiple read sessions, even during appending. Different write sessions can append to the same user-defined table, but to different files of the table, concurrently.

In various embodiments, since segments write all appended data into the file system permanently before committing a transaction and the metadata's durability is protected by the master's transaction, all append operations will take effect permanently after the master has committed the transaction.

Using techniques disclosed herein, transactional qualities such as atomicity, isolation, consistency, and durability can be provided using a transaction model that is simple, is relatively easy to implement, and which requires relatively less interaction between the master and segments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   sending to each of a plurality of segments to which a corresponding assigned portion of a query plan is assigned an associated transaction-related metadata, wherein the transaction-related metadata sent to each of the plurality of segments is associated with the corresponding assigned portion of the query plan assigned to the corresponding one of the plurality of segments and is determined to be used by a corresponding one of the plurality of segments to process the corresponding assigned portion of the query plan;
   receiving from zero or more of the plurality of segments a corresponding metadata modification record reflecting changes, if any, to system metadata required to be made to reflect changes to data made by that segment in processing the portion of the query plan assigned to that segment;

determining whether the corresponding metadata modification record has been received from each of the of segments in the plurality of segments;

in the event the corresponding metadata modification record is determined to have been received from each of the segments in the plurality of segments, updating a system metadata store to reflect the corresponding metadata modification records received from the plurality of segments, wherein the updating of the system metadata store comprises:

replaying, by a master node, the corresponding metadata modification records received from each of the plurality of segments; and committing, by the master node, a transaction with which the query plan is associated, wherein the transaction is committed in response to determining that all of the plurality of segments to which a corresponding portion of the query plan is assigned have successfully completed the corresponding assigned portion for the query plan; and in the event that one or more of the plurality of segments fail to successfully complete the corresponding assigned portion of the query plan, aborting the transaction with which the query plan is associated.

2. The method of claim 1, further comprising committing an associated system-wide transaction based at least in part on the determination that the corresponding metadata modification record has been received from each of the segments in the plurality of segments.

3. The method of claim 1, wherein the query plan is associated with a query.

4. The method of claim 3, further comprising receiving the query.

5. The method of claim 3, further comprising generating the query plan.

6. The method of claim 1, wherein the transaction-related metadata includes for a file to be modified by the receiving segment in accordance with the portion of the query plan assigned to that segment one or more of a file size and a file extent of the file.

7. The method of claim 6, wherein the segment is configured to compare the received one or more of a file size and a file extent of the file to a corresponding data obtained from a file system in which the file is stored persistently.

8. The method of claim 7, wherein the segment is further configured to truncate the file as stored in the file system based at least in part on a determination that the file as stored in the file system include data in addition a valid data indicated by the one or more of a file size and a file extent of the file.

9. The method of claim 1, wherein the transaction with which the query plan is associated is aborted in the event it is determined that the corresponding metadata modification record has not been received from one or more segments included in the plurality of segments.

10. The method of claim 9, wherein aborting the transaction includes not updating the system metadata to reflect one or more corresponding metadata modification records that have been received.

11. A system, comprising:
a communication interface; and
a processor coupled to the communication interface and configured to:

send, via the communication interface, to each of a plurality of segments to which a corresponding assigned portion of a query plan is assigned, an associated transaction-related metadata, wherein the transaction-related metadata sent to each of the plurality of segments is associated with the corresponding assigned portion of the query plan assigned to the corresponding one of the plurality of segments and is determined to be used by a corresponding one of the plurality of segments to process the corresponding assigned portion of the query plan;

receive from zero or more of the plurality of segments a corresponding metadata modification record reflecting changes, if any, to system metadata required to be made to reflect changes to data made by that segment in processing the portion of the query plan assigned to that segment;

determine whether the corresponding metadata modification record has been received from each of the of segments in the plurality of segments;

in the event the corresponding metadata modification record is determined to have been received from each of the segments in the plurality of segments, update a system metadata store to reflect the corresponding metadata modification records received from the plurality of segments, wherein to update the system metadata store comprises:

replaying the corresponding metadata modification records received from each of the plurality of segments; and committing a transaction with which the query plan is associated, wherein the transaction is committed in response to determining that all of the plurality of segments to which a corresponding portion of the query plan is assigned have successfully completed the corresponding assigned portion for the query plan; and in the event that one or more of the plurality of segments fail to successfully complete the corresponding assigned portion of the query plan, aborting the transaction with which the query plan is associated.

12. The system of claim 11, wherein the processor is further configured to commit an associated system-wide transaction based at least in part on the determination that the corresponding metadata modification record has been received from each of the segments in the plurality of segments.

13. The system of claim 11, wherein the transaction-related metadata includes for a file to be modified by the receiving segment in accordance with the portion of the query plan assigned to that segment one or more of a file size and a file extent of the file.

14. The system of claim 13, wherein the segment is configured to compare the received one or more of a file size and a file extent of the file to a corresponding data obtained from a file system in which the file is stored persistently.

15. The system of claim 14, wherein the segment is further configured to truncate the file as stored in the file system based at least in part on a determination that the file as stored in the file system include data in addition a valid data indicated by the one or more of a file size and a file extent of the file.

16. The system of claim 11, wherein the processor is further configured to abort a transaction with which the query plan is associated in the event it is determined that the corresponding modification record has not been received from one or more segments included in the plurality of segments.

17. The system of claim 11, wherein aborting the transaction includes not updating the system metadata to reflect one or more corresponding metadata modification records that have been received.

18. A computer program product embodied in a tangible, non-transitory computer-readable storage medium, comprising computer instructions for:
  sending to each of a plurality of segments to which a corresponding assigned portion of a query plan is assigned an associated transaction-related metadata, wherein the transaction-related metadata sent to each of the plurality of segments is associated with the corresponding assigned portion of the query plan assigned to the corresponding one of the plurality of segments and is determined to be used by a corresponding one of the plurality of segments to process the corresponding assigned portion of the query plan;
  receiving from zero or more of the plurality of segments a corresponding metadata modification record reflecting changes, if any, to system metadata required to be made to reflect changes to data made by that segment in processing the portion of the query plan assigned to that segment;
  determining whether the corresponding metadata modification record has been received from each of the of segments in the plurality of segments;
  in the event the corresponding metadata modification record is determined to have been received from each of the segments in the plurality of segments, updating a system metadata store to reflect the corresponding metadata modification records received from the plurality of segments, wherein updating the system metadata store comprises:
    replaying the corresponding metadata modification records received from each of the plurality of segments; and
    committing a transaction with which the query plan is associated, wherein the transaction is committed in response to determining that all of the plurality of segments to which a corresponding portion of the query plan is assigned have successfully completed the corresponding assigned portion for the query plan; and
  in the event that one or more of the plurality of segments fail to successfully complete the corresponding assigned portion of the query plan, aborting the transaction with which the query plan is associated.

19. The computer program product of claim 18, wherein the transaction-related metadata includes for a file to be modified by the receiving segment in accordance with the portion of the query plan assigned to that segment one or more of a file size and a file extent of the file.

20. The computer program product of claim 18, further comprising computer instructions to abort a transaction with which the query plan is associated in the event it is determined that the corresponding modification record has not been received from one or more segments included in the plurality of segments.

21. The method of claim 1, further comprising:
  in response to receiving a query from a user, recoding a current snapshot of a distributed database system.

22. The method of claim 21, wherein the current snapshot includes transaction identifiers for transactions that are running when a transaction with which the query plan is associated starts.

23. The method of claim 1, wherein modifications to metadata on one or more segments are not visible on the master node until the master node receives all corresponding metadata modification from the respective plurality of segments to which the corresponding assigned portion of the query plan is sent, and replays the corresponding metadata modification records.

24. The method of claim 1, wherein in the event that the transaction is aborted, the system metadata is not updated to incorporate any of the corresponding modification records received the corresponding plurality of segments that successfully completed the corresponding assigned portion of the query plan.

25. The method of claim 1, wherein the aborting the transaction with which the query plan is associated in the event that that one or more of the plurality of segments fail to successfully complete the corresponding assigned portion of the query plan comprises:
  determining whether a file size as stored on a distributed file system matches a size of a file reflected in system metadata according to a reporting by the master node; and
  in the event that the file size stored on the distributed file system is greater than the size of the file reflected in the system metadata according to the reporting by the master node, truncating the file as stored on the distributed file system so that the size of the file as stored on the distributed file system matches the size of the file reflected in the system metadata at time a current transaction started.

* * * * *